US011917948B2

(12) United States Patent
Giuliani (10) Patent No.: US 11,917,948 B2
(45) Date of Patent: Mar. 5, 2024

(54) AGRICULTURAL BALER WITH WRAPPING MATERIAL KNIFE TO REDUCE ROTOR WRAP-AROUND (71) Applicant: CNH Industrial America LLC, New Holland, PA (US)

(72) Inventor: Enrico Giuliani, Russi (IT)

(73) Assignee: CNH Industrial America LLC, New Holland, PA (US)

( * ) Notice: Subject to any disclaimer, the term of this patent is extended or adjusted under 35 U.S.C. 154(b) by 420 days.

(21) Appl. No.: 17/192,760

(22) Filed: Mar. 4, 2021

(65) Prior Publication Data

US 2021/0274717 A1    Sep. 9, 2021

(30) Foreign Application Priority Data

Mar. 4, 2020 (IT) .......................... 102020000004612

(51) Int. Cl.
*A01F 15/07* (2006.01)
*A01F 15/10* (2006.01)

(52) U.S. Cl.
CPC ........ *A01F 15/0715* (2013.01); *A01F 15/106* (2013.01)

(58) Field of Classification Search
CPC ................ A01F 15/0715; A01F 15/106; A01F 2015/0725; A01F 15/10
See application file for complete search history.

(56) References Cited

U.S. PATENT DOCUMENTS

| 799,175 A | * | 9/1905 | Luebben ............... A01F 15/141 100/88 |
| 4,253,387 A | * | 3/1981 | Schmitt ................. A01F 15/141 100/88 |
| 4,691,606 A | * | 9/1987 | Johnson .................... B26F 1/20 83/660 |

(Continued)

FOREIGN PATENT DOCUMENTS

| CA | 2917138 A1 | 1/2015 | |
| DE | 3816204 A1 | * 11/1989 | ............. A01D 90/04 |

(Continued)

OTHER PUBLICATIONS

Search Report for Italian application 102020000004612, dated Nov. 20, 2020 (7 pages).

*Primary Examiner* — Arpad F Kovacs
(74) *Attorney, Agent, or Firm* — Peter K. Zacharias (57) ABSTRACT An agricultural vehicle includes: a bale chamber configured to form a bale therein; a pickup having a plurality of tines configured to pickup and convey crop material rearwardly during rotation of the pickup; a rotatable rotor having a plurality of teeth configured to convey crop material rearwardly toward the bale chamber through a feeding mouth during rotation of the rotor; a wrapping system comprising a material roll configured to hold wrapping material fed to the bale; and a bale chamber roller disposed adjacent to the feeding mouth and defining a last roller of the bale chamber relative to the material roll. At least one wrap material knife includes at least one severing edge disposed between the bale chamber roller and the rotor and configured to sever wrapping material pulled forwardly by the rotor during rotation of the rotor.

15 Claims, 6 Drawing Sheets

(56) References Cited

U.S. PATENT DOCUMENTS

| | | | |
|---|---|---|---|
| 4,729,213 A * | 3/1988 | Raes | A01F 15/0715 100/88 |
| 4,956,968 A * | 9/1990 | Underhill | A01F 15/0715 53/118 |
| 5,036,642 A * | 8/1991 | Underhill | A01F 15/0715 53/118 |
| 5,231,828 A * | 8/1993 | Swearingen | A01F 15/141 100/88 |
| 5,259,167 A * | 11/1993 | Underhill | A01F 15/0715 53/118 |
| 5,581,976 A * | 12/1996 | Underhill | A01F 15/141 53/399 |
| 5,709,143 A | 1/1998 | Bentley | |
| 5,816,038 A * | 10/1998 | Anderson | A01F 15/141 100/88 |
| 6,209,450 B1 * | 4/2001 | Naaktgeboren | A01F 15/141 56/341 |
| 6,276,421 B1 * | 8/2001 | Valenti | B26D 7/1863 156/566 |
| 6,681,688 B1 | 1/2004 | Smith | |
| 6,763,761 B1 * | 7/2004 | Smith | A01F 15/141 100/88 |
| 7,124,568 B2 | 10/2006 | Hotaling | |
| 7,181,900 B2 * | 2/2007 | Hood | A01F 15/0715 100/88 |
| 7,252,587 B2 | 8/2007 | Viaud | |
| 7,398,727 B2 * | 7/2008 | Wright | A01F 15/145 100/6 |
| 9,549,506 B2 | 1/2017 | McClure | |
| 10,039,237 B2 | 8/2018 | Smith et al. | |
| 10,375,893 B2 * | 8/2019 | Rosseel | B65B 11/04 |
| 2004/0016204 A1 * | 1/2004 | Chow | A01F 15/0715 53/118 |
| 2005/0091959 A1 | 5/2005 | Viaud et al. | |
| 2005/0262822 A1 * | 12/2005 | Hotaling | A01F 15/106 56/341 |
| 2011/0179750 A1 * | 7/2011 | Smith | A01F 15/0715 53/399 |
| 2012/0073455 A1 * | 3/2012 | Vandamme | B65B 27/125 100/49 |
| 2015/0033666 A1 * | 2/2015 | Ravaglia | A01F 15/0715 53/137.2 |
| 2019/0014725 A1 | 1/2019 | Gresset et al. | |
| 2021/0137014 A1 * | 5/2021 | Simmons | A01F 15/0715 |

FOREIGN PATENT DOCUMENTS

| | | | | |
|---|---|---|---|---|
| DE | 102014208081 A1 * | 10/2015 | | A01F 15/0715 |
| EP | 0129021 A2 * | 12/1984 | | A01F 15/0715 |
| EP | 0655189 A1 * | 5/1995 | | A01F 15/106 |
| EP | 1716745 A1 * | 11/2006 | | A01F 15/0715 |
| EP | 2387872 A1 | 11/2011 | | |
| EP | 3078255 A1 * | 10/2016 | | A01D 89/008 |
| EP | 3111747 A1 | 1/2017 | | |
| EP | 3264881 B1 * | 6/2019 | | A01F 15/0715 |
| FR | 2702629 A1 * | 9/1994 | | A01F 15/07 |
| GB | 2313089 A * | 11/1997 | | A01D 89/004 |

* cited by examiner

AGRICULTURAL BALER WITH WRAPPING MATERIAL KNIFE TO REDUCE ROTOR WRAP-AROUND

BACKGROUND OF THE INVENTION

The present invention pertains to agricultural vehicles and, more specifically, to agricultural vehicles with a rotor for conveying crop material into the vehicle.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

In some instances, wrapping material intended to be wrapped around the bale is undesirably dispensed and/or wrapped within the vehicle. In such instances, the operator may need to stop operation of the vehicle to fix the issue, which is inconvenient and frustrating for the operator.

What is needed in the art is a way to reduce undesirable dispensing of wrapping material in an agricultural vehicle.

SUMMARY OF THE INVENTION

The present invention provides one or more wrap material knives with at least one severing edge disposed between a last bale chamber roller and a rotor and configured to sever wrapping material pulled by the rotor during rotation.

The invention in one form is directed to an agricultural vehicle including: a bale chamber configured to form a bale therein; a pickup having a plurality of tines configured to pickup and convey crop material rearwardly during rotation of the pickup; a rotatable rotor having a plurality of teeth configured to convey crop material rearwardly toward the bale chamber through a feeding mouth during rotation of the rotor; a wrapping system including a material roll configured to hold wrapping material fed to the bale; and a bale chamber roller disposed adjacent to the feeding mouth and defining a last roller of the bale chamber relative to the material roll. At least one wrap material knife includes at least one severing edge disposed between the bale chamber roller and the rotor and configured to sever wrapping material pulled forwardly by the rotor during rotation of the rotor.

In some embodiments, the at least one wrap material knife has a serrated edge with a plurality of severing edges. In some embodiments, the wrap material knife may have a flat, sharpened edge and/or a linearly shaped severing edge.

In some embodiments, the agricultural vehicle includes a rotor scraper with a plurality of scraper plates positioned such that each of the teeth of the rotor passes a respective one of the scraper plates to scrape the teeth during a full rotation of the rotor. The at least one wrap material knife is coupled to a rear side of the rotor scraper. The at least one wrap material knife may be a plurality of wrap material knives coupled to the rear side of the rotor scraper. At least some of the wrap material knives may be disposed between a respective pair of scraper plates.

In some embodiments, the rotor is rotatable about an axis of rotation and the at least one wrap material knife is positioned rearwardly of the axis of rotation.

In some embodiments, the at least one wrap material knife is rearwardly angled such that the at least one severing edge is below and rearward of an opposite edge.

In some embodiments, the at least one wrap material knife is configured to stay generally fixed in place. The at least one wrap material knife may, for example, be bolted in place.

In some embodiments, the at least one wrap material knife is configured to move between a first position and a second position. The at least one wrap material knife may be configured to pivot between the first position and the second position. The wrap material knife may also, or alternatively, be retractable, with or without pivoting.

In some embodiments, the agricultural vehicle is a round baler.

An advantage of the present invention is that the wrap material knife is configured to sever wrapping material pulled by the rotor, which can quickly and easily prevent a large amount of wrapping material being pulled by the rotor that must be then removed by an operator.

Another advantage is that the wrap material knife severing the wrapping material pulled by the rotor can assist in redirecting the wrapping material back to its desired path to wrap the bale.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the vehicle, but should not be limited to such.

Figure 1:
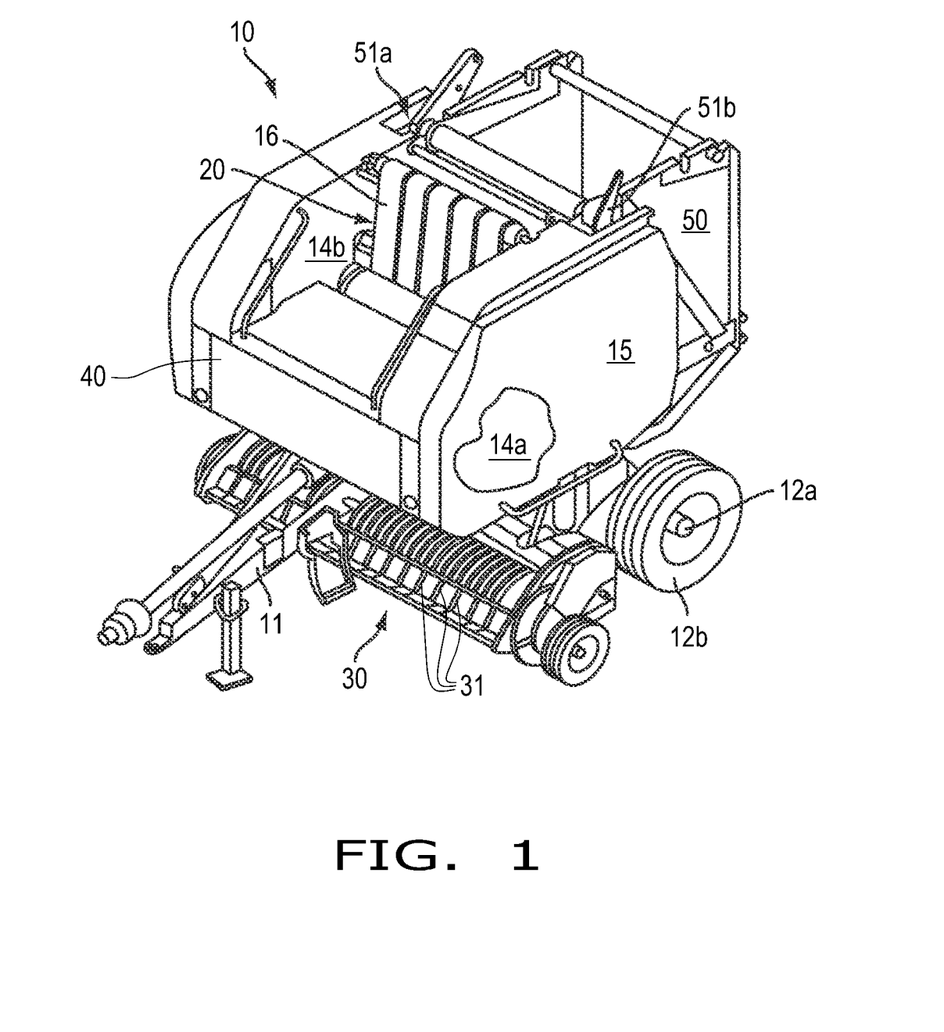
FIG. 1 illustrates a perspective view of an exemplary embodiment of an agricultural vehicle, in the form of a round baler, provided in accordance with the present disclosure.

Referring now to the drawings, and more particularly to FIG. 1, an exemplary embodiment of an agricultural vehicle 10, illustrated in the form of a round baler, is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale chamber 20 configured to form a bale from crop material conveyed therein. Cut crop material is picked up by a plurality of tines 31 of a transverse pickup 30, which is part of a feeding assembly 100, and conveyed rearwardly toward the bale chamber 20 where it is formed into a cylindrically shaped bale by a series of conveyor belts 16. The bale is then wrapped with wrapping material, which may be, for example, twine, net wrapping, a solid polymer, or other type of material dispensed from a material roll 61 of a wrapping system 60 (illustrated in more detail in FIG. 2A) generally behind shield 40. Upon completion of the wrapping process, the tailgate 50 pivots upwardly about pivot points 51a, 51b and the bale is discharged onto the ground.

Figure 2A:
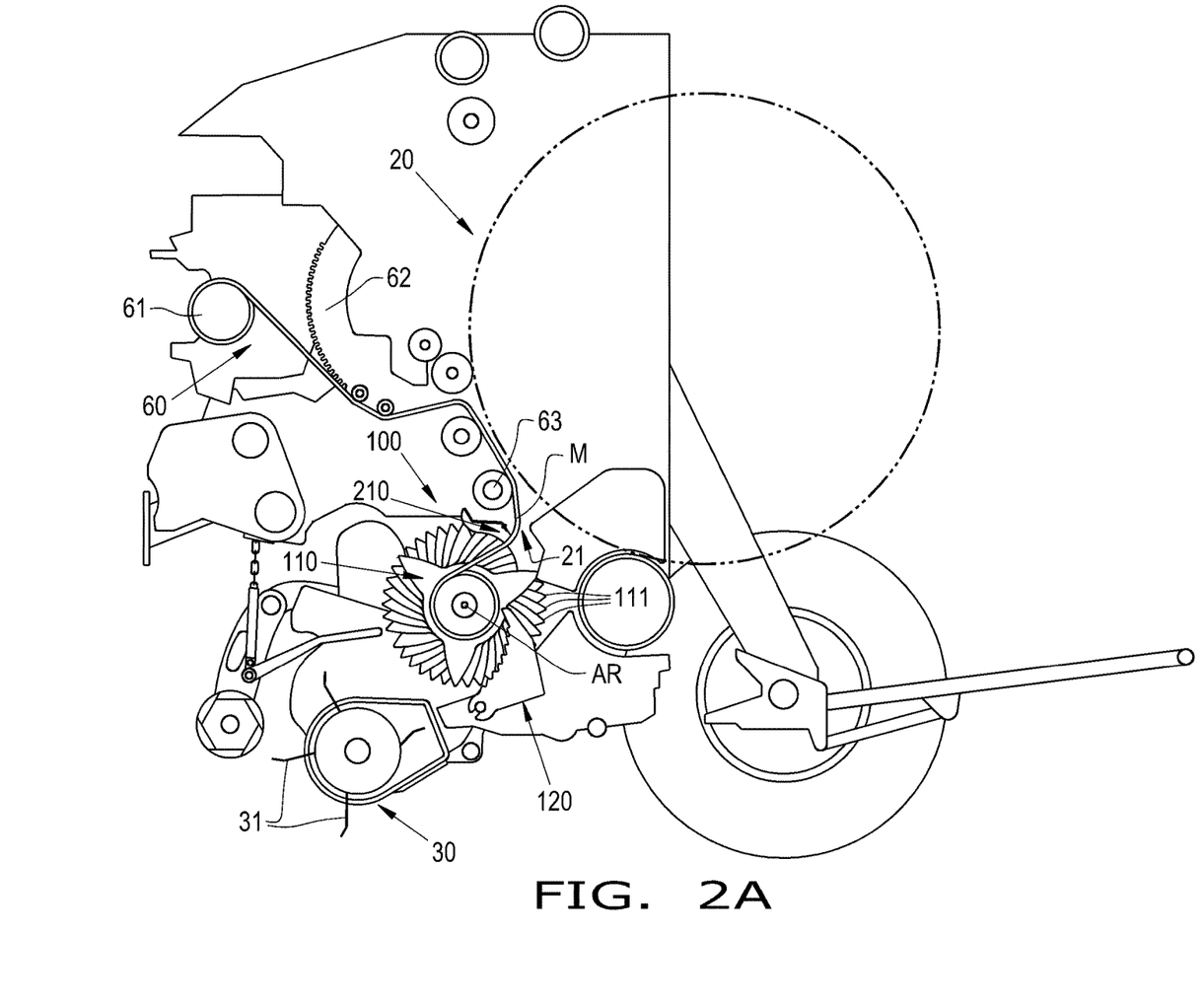
FIG. 2A illustrates a sectional side view of the round baler of FIG. 1 when wrapping material has been caught by a rotor.
Figure 2B:
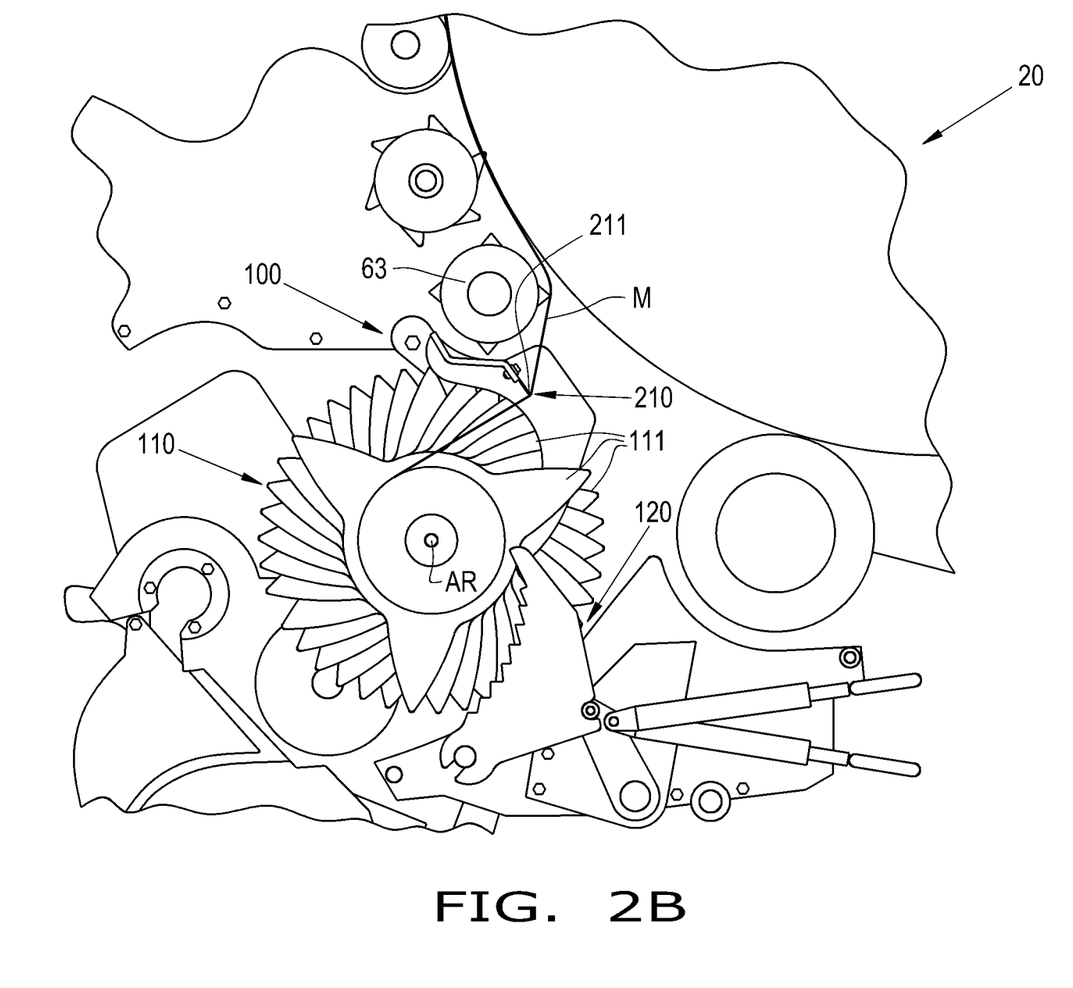
FIG. 2B illustrates another sectional side view of the round baler of FIG. 1 and FIG. 2A when wrapping material has been caught by the rotor.

Referring now to FIGS. 2A and 2B as well, it is illustrated how the feeding assembly 100 includes a rotatable rotor 110 that includes a plurality of teeth 111 configured to convey crop material rearwardly toward the bale chamber 20 through a feeding mouth 21 during rotation of the rotor 110. The feeding mouth 21 defines an entry region of crop material into the bale chamber 20. The rotor 110 is configured to receive crop material conveyed by the tines 31 of the pickup 30 and convey the crop material further rearwardly toward the bale chamber 20 through the feeding mouth 21. In some embodiments, a cutting knife assembly 120 is included that has retractable knives that can be brought into and out of a cutting position where the knives act with the teeth 111 to further chop crop material as it is conveyed rearwardly. In some embodiments, the rotor 110 conveys crop material directly toward the bale chamber 20 without further chopping of the crop material. In the bale chamber 20, the crop material is rolled by the belts 16 and bale chamber rollers, including bale chamber roller 63, to form the bale. The bale chamber roller 63 defines a last roller of the bale chamber 20 relative to the material roll 61, as will be described further herein.

After the bale is fully formed in the bale chamber 20, wrapping material from the material roll 61 of the wrapping system 60 is dispensed onto the formed bale. The wrapping material may be initially dispensed onto the formed bale using, for example, a dispensing system 62. Continued rotation of the bale after the initial dispensing of wrapping material onto the bale draws wrapping material from the material roll 61 around the bale to wrap the bale. The wrapping material may be any type of material that is suitable for wrapping the bale, such as the previously described examples of twine, net wrapping, and solid polymer. After the bale is wrapped, the wrapped bale is released from the baler 10, as previously described, so a new bale may be formed.

In known balers, wrapping material that is being dispensed occasionally gets caught on teeth of the rotor. When wrapping material is caught on the rotor, further rotation of the bale still draws wrapping material from the material roll but the drawn wrapping material gets wrapped around the rotor, which may be rotating on its own or due to the caught wrapping material being pulled by the rotating bale. The wrapping material getting wrapped around the rotor not only wastes wrapping material, but also disrupts dispensing of the wrapping material around the bale. To address the issue, an operator must stop the baling operation, manually unwrap the wrapping material from the rotor, and, in some instances, guide the wrapping material back around the partially wrapped or unwrapped bale. Correcting the issue is frustrating to the operator and can waste a significant amount of time.

To address some of the previously described issues with known balers, and referring still to FIGS. 2A and 2B as well as FIGS. 3-5B, the agricultural vehicle 10 provided according to the present disclosure includes one or more wrap material knives 210, illustrated as a plurality of wrap material knives 210, that have one or more severing edges 211 disposed between the bale chamber roller 63 and the rotor 110. The severing edges 211 are configured to sever wrapping material M that is pulled forwardly, i.e., away from the bale forming in the bale chamber 20, by the rotor 110 during rotation of the rotor 110 caused by, e.g., rotation of the bale pulling wrapping material from the material roll 61 and/or operating rotation of the rotor 110. As the wrapping material M is pulled away from the bale by the rotor 110, the wrapping material M is pulled taut against the bale chamber roller 63 and against the severing edges 211 of the wrap material knife 210, which quickly severs the wrapping material M to prevent further wrapping of the wrapping material M around the rotor 110.

The severing edge(s) 211 is disposed between the bale chamber roller 63 and the rotor 110 so the wrapping material M that is pulled by the rotor 110 is necessarily pulled against the severing edge(s) 211 and severed. The bale chamber roller 63 is the last, i.e., furthest, roller of the bale chamber 20 from the material roll 61 and thus represents a location where the wrapping material M changes its travel direction when pulled taut by the rotor 110, as best illustrated in FIG. 2A. The wrap material knives 210 are positioned so the severing edge(s) 211 is disposed in this travel path of the wrapping material M that extends from the material roll 61 to the rotor 110 and the pulled wrapping material M necessarily comes into contact with the severing edges 211 when pulled by the rotor 110 to quickly sever the wrapping material M and reduce the amount of wrapping material that wraps around the rotor 110. Further rotation of the bale also draws the wrapping material wrapped around the rotor 110 back around the bale after the wrapping material M pulled by the rotor 110 is severed, preventing the wrapping material from being wasted and interfering with operation of the rotor 110. While the entirety of the wrap material knives 210 are illustrated as being disposed between the bale chamber roller 63 and the rotor 110, in some embodiments the wrap material knives 210 are elongated so a portion of the wrap material knives 210 are not disposed between the bale chamber roller 63 and the rotor 110. It should thus be appreciated that the wrap material knives 210 may be configured and disposed in many different ways, so long as the severing edge(s) 211 of the wrap material knives 210 is disposed between the bale chamber roller 63 and the rotor 110 to sever the wrapping material M pulled by the rotor 110.

Figure 3:
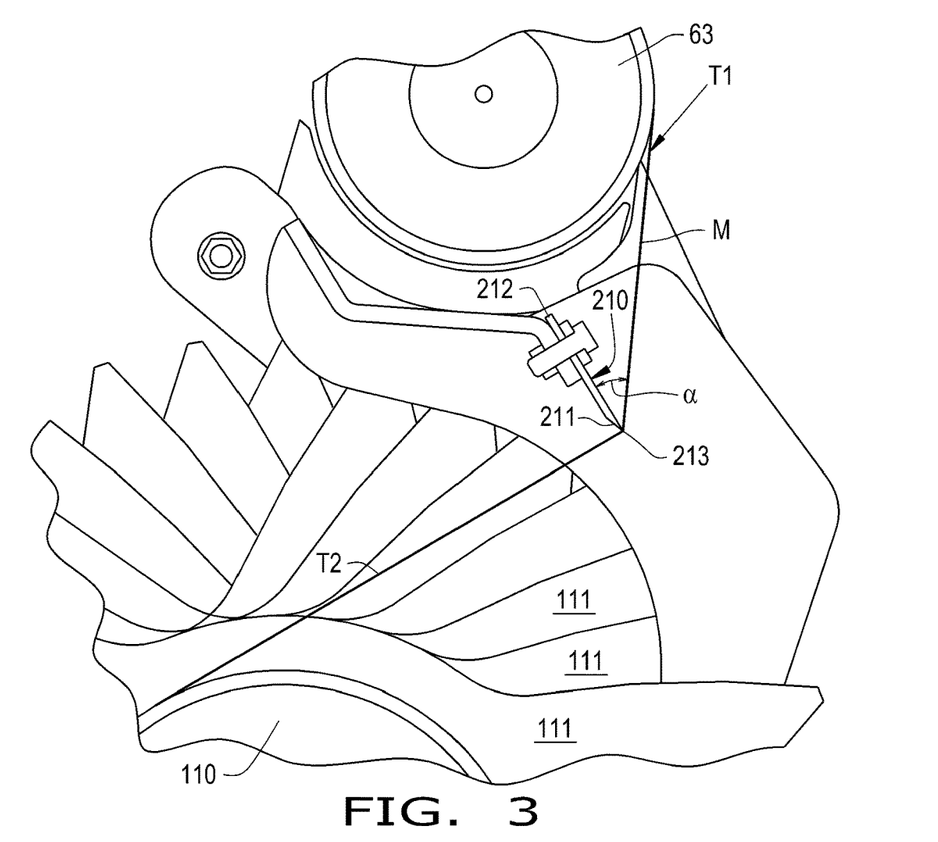
FIG. 3 illustrates a close-up side view of a portion of the round baler of FIGS. 1-2B with a wrap material knife that is about to sever wrapping material being pulled by the rotor.

Referring specifically now to FIGS. 2A, 2B, and 3, it is illustrated how the severing edges 211 of the one or more wrap material knives 210 are oriented. As can be seen, the rotor 110 is rotatable about an axis of rotation AR and the wrap material knife 210 may be disposed rearwardly of the axis of rotation AR. In some embodiments, the wrap material knife 210 is rearwardly angled such that the severing edge(s) 211 is below and rearward of an opposite edge 212 of the wrap material knife 210. The wrap material knife 210 may extend at a knife angle a that is between approximately 20° and 60°, more particular between 30° and 40°, measured between a tip 213 of the wrap material knife 210 and an imaginary tangential line T1 from the bale chamber roller 63 that the wrapping material M is in contact with when wrapped around the rotor 110. In some embodiments, the tip 213 of the wrap material knife 210 may also be generally perpendicular to an imaginary tangential line T2 of the rotor 110. It should be appreciated that the previously described angles are exemplary only and will depend on the relative positioning of the elements within the vehicle 10, and thus the positioning of the wrap material knife 210 may be altered as needed, i.e., the previously described angles are not critical and may be adjusted in many ways according to the present disclosure.

Figure 4A:
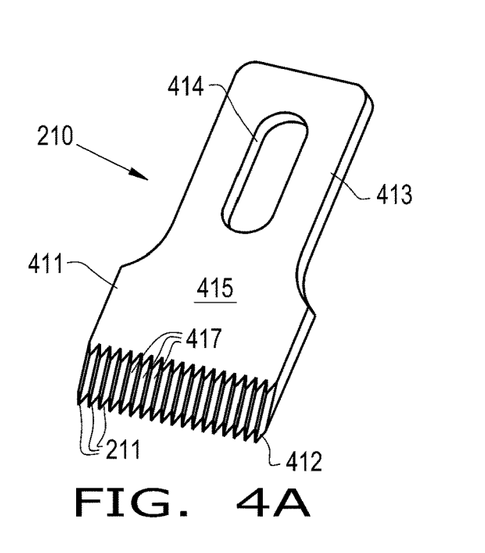
FIG. 4A illustrates a front view of the wrap material knife illustrated in FIG. 3.
Figure 4B:
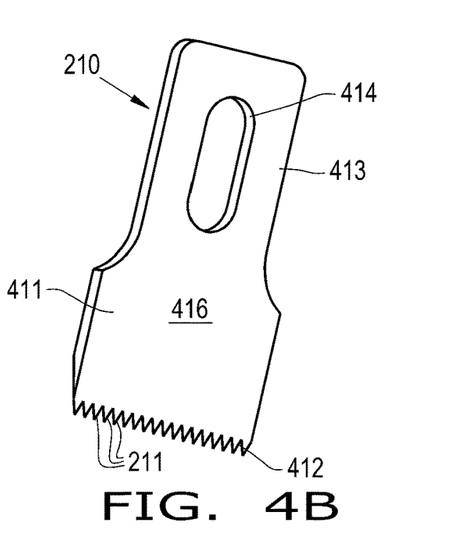
FIG. 4B illustrates a rear view of the wrap material knife illustrated in FIG. 4A.

Referring specifically now to FIGS. 4A and 4B, one of the wrap material knives 210 is illustrated in greater detail. While only one of the wrap material knives 210 is illustrated in FIGS. 4A and 4B, it should be appreciated that all of the wrap material knives 210 may be configured similarly. As illustrated, the wrap material knife 210 may include a severing portion 411 including the severing edges 211 as part of a serrated edge 412 and a mounting portion 413 that includes a fastener opening 414, which will be described further herein. The wrap material knife 210 defines a front side 415, illustrated in FIG. 4A, and a rear side 416, illustrated in FIG. 4B. The severing portion 411 may include a plurality of grooves 417 on the front side 415 that connect to the severing edges 211 of the serrated edge 412. The wrap material knife 210 may comprise a variety of materials, including but not limited to a metal such as stainless steel, which may be hardened and/or coated to increase the durability of the wrap material knife 210.

While the wrap material knives 210 are illustrated and described as being serrated knives, it should be appreciated that the wrap material knives 210 may be other types of knives. In some embodiments, the wrap material knives 210 have a single, linear severing edge. Alternatively, the wrap material knives 210 may have a plurality of linear severing edges, such as two linear severing edges. It should thus be appreciated that the wrap material knives 210 may be configured in a wide variety of ways to sever wrapping material that comes into contact with the severing edge(s) of the knives 210.

Figure 5A:
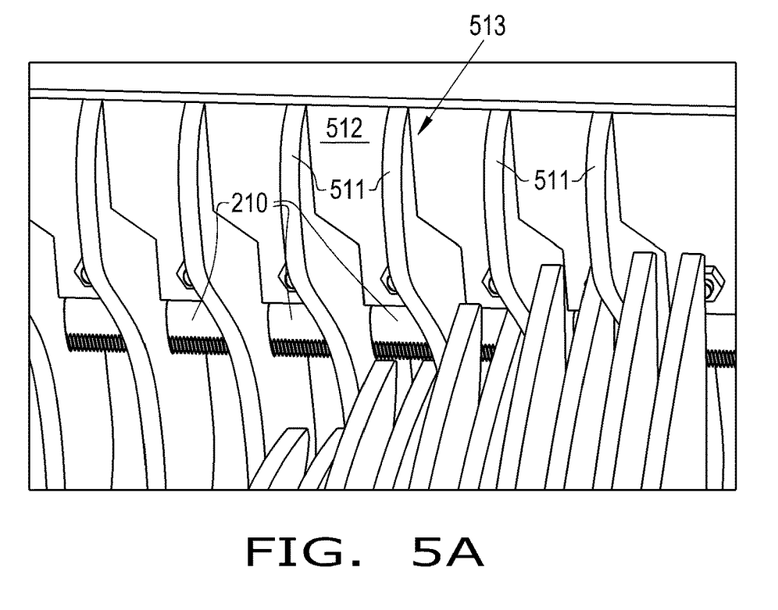
FIG. 5A illustrates a front view of a portion of the round baler of FIGS. 1-3.
Figure 5B:
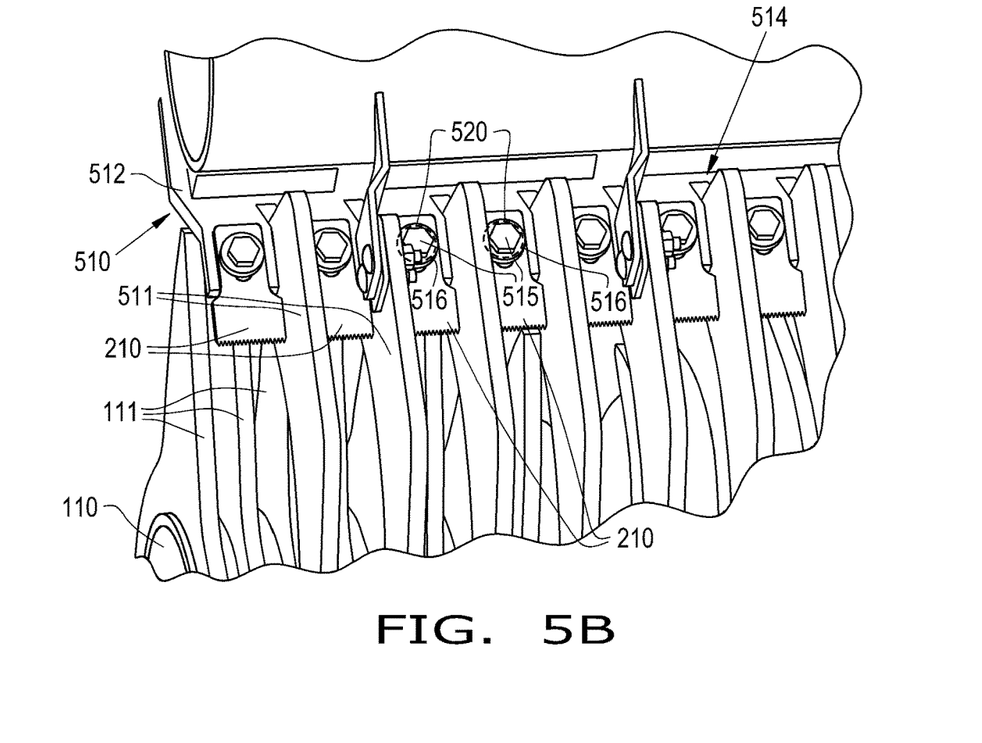
FIG. 5B illustrates a rear view of the portion of the round baler illustrated in FIG.
Figure 6:
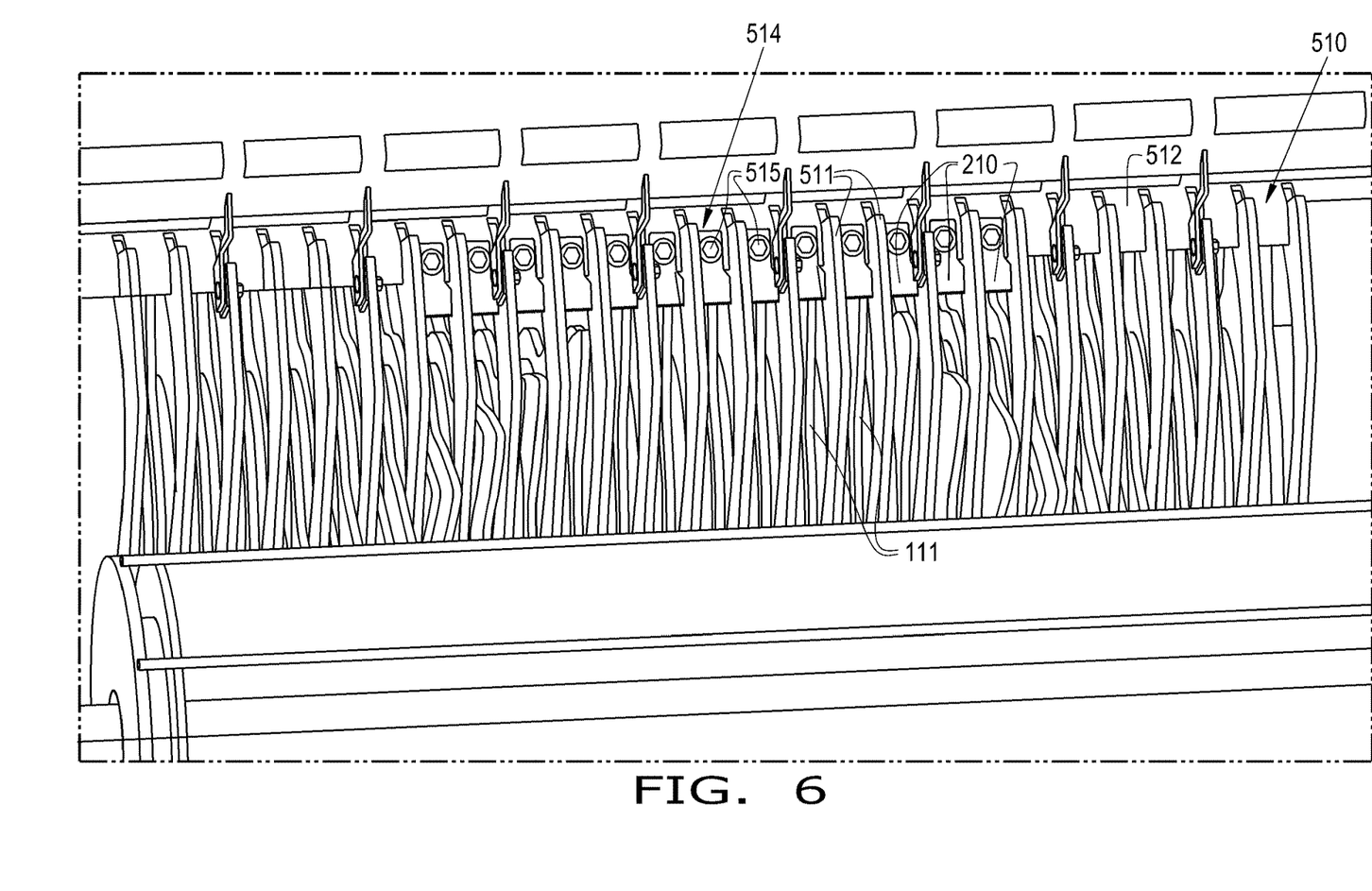
FIG. 6 illustrates a rear view of an exemplary embodiment of a round baler which includes wrap material knives disposed adjacent to a center of a rotor scraper.

In some embodiments, and referring now to FIGS. 5A, 5B, and 6, the feeding assembly 100 includes a rotor scraper 510 that includes a plurality of scraper plates 511 positioned such that each of the teeth 111 of the rotor 110 pass a respective scraper plate 511 to scrape material off the teeth 111 during a full rotation of the rotor 110 about the axis of rotation AR. In other words, the scraper plates 511 act to scrape accumulated crop material debris and other particles from the teeth 111 during rotation of the rotor 110. The scraper plates 511 may be coupled to a mounting base 512 of the rotor scraper 510. The rotor scraper 510 has a front side 513 and a rear side 514. In some embodiments, the wrap material knives 210 are coupled to the rear side 514 of the rotor scraper 510 using, for example, fasteners 515 that extend through the fastener opening 414 of the wrap material knives 210 to couple the wrap material knives 210 to the mounting base 512 of the rotor scraper 510. In some embodiments, some of the wrap material knives 210 are disposed between a respective pair of scraper plates 511 so the wrap material knives 210 fill some or all of the space between adjacent scraper plates 511. In some embodiments, the wrap material knives 210 are disposed on top of the scraper plates 511. The wrap material knives 210 may extend across an entire width of the rotor scraper 510, as illustrated in FIGS. 5A and 5B. In some embodiments, such as the embodiment illustrated in FIG. 6, the wrap material knives 210 are located adjacent to a lateral centerline of the rotor scraper 510, which is where wrapping material M pulled away from the bale by the floor roll tends to be pulled.

As illustrated, the wrap material knives 210 are bolted to the rotor scraper 510. In such an embodiment, the wrap material knives 210 are configured to stay generally fixed in place, i.e., the wrap material knives 210 exhibit little, if any, movement during operation. However, in some embodiments the wrap material knives 210 are configured to move between a first position and a second position, i.e., the wrap material knives 210 are configured as movable knives. The wrap material knives 210 may, for example, be configured to pivot about a hinge point between the first position and the second position, i.e., the wrap material knives 210 may be pivotably coupled to the rotor scraper 510 or elsewhere to pivot around a pivot point. Pivoting of the wrap material knives 210 may be effected, for example, by placing a spring 520 between a head 516 of each fastener 515 and its respective wrap material knife 210 and oversizing the fastener openings 414 of the wrap material knives 210. Pivoting of the wrap material knives 210 rearwardly may occur, for example, due to contact between the teeth 111 of the rotor 110 and the front sides 513 of the wrap material knives 210; once the contact ends, the springs 520 may force the wrap material knives 210 back into their original positions. By utilizing such a configuration, the wrap material knives 210 may also act to remove accumulated material from tips of the teeth 111. The wrap material knives 210 may also be retractable, e.g., by being slidable between the first position and the second position. The wrap material knives 210 may be configured to move in other ways, e.g., coupling the wrap material knives 210 to a selectively activated actuator. It should thus be appreciated that the wrap material knives 210 may be movable in a wide variety of ways and the previously described ways of moving the wrap material knives 210 are exemplary only.

From the foregoing, it should be appreciated that the agricultural vehicle 10 including the wrap material knives 210 is less prone to a significant amount of wrapping material undesirably wrapping around the rotor 110 during operation. The wrap material knives 210 can thus reduce the amount of wrapping material that is wasted as well as reduce, if not eliminate, the number of instances where an operator must manually unwrap material from the rotor 110.

Further, the wrap material knives 210 severing the wrapping material M that is pulled forwardly and/or away from the bale prevents further misguiding of the wrapping material M so rotation of the bale pulls the misguided wrapping material M back onto the bale. Thus, the agricultural vehicle 10 provided according to the present disclosure reduces the detrimental effects of misguided wrapping material on operation of the agricultural vehicle 10.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope of the invention.

The invention claimed is:

1. An agricultural vehicle, comprising:
   a bale chamber configured to form a bale therein;
   a pickup comprising a plurality of tines configured to pick_up and convey crop material rearwardly during rotation of the pickup;
   a rotatable rotor comprising a plurality of teeth configured to convey crop material discharged from the pickup rearwardly toward the bale chamber through a feeding mouth during rotation of the rotor;
   a wrapping system comprising a material roll configured to hold wrapping material fed to the bale;
   a bale chamber roller disposed adjacent to the feeding mouth and defining a last roller of the bale chamber relative to the material roll; and
   at least one wrap material knife comprising at least one severing edge disposed between the bale chamber roller and the rotor and configured to sever wrapping material pulled forwardly by the rotor during rotation of the rotor.

2. The agricultural vehicle of claim 1, wherein the at least one wrap material knife comprises a serrated edge comprising a plurality of severing edges and/or comprises at least one linear severing edge.

3. The agricultural vehicle of claim 1, further comprising a rotor scraper comprising a plurality of scraper plates positioned such that each of the teeth of the rotor passes a respective one of the scraper plates to scrape material off the teeth during a full rotation of the rotor, wherein the at least one wrap material knife is coupled to a rear side of the rotor scraper.

4. The agricultural vehicle of claim 3, wherein the at least one wrap material knife comprises a plurality of wrap material knives coupled to the rear side of the rotor scraper.

5. The agricultural vehicle of claim 4, wherein at least some of the wrap material knives are disposed between a respective pair of scraper plates and/or are disposed on top of the scraper plates.

6. The agricultural vehicle of claim 1, wherein the rotor is rotatable about an axis of rotation and the at least one wrap material knife is positioned rearwardly of the axis of rotation.

7. The agricultural vehicle of claim 1, wherein the at least one wrap material knife is rearwardly angled such that the at least one severing edge is below and rearward of an opposite edge of the wrap material knife.

8. The agricultural vehicle of claim 1, wherein the at least one wrap material knife extends at a knife angle, the knife angle being an angle between a tip of the at least one wrap material knife and a tangential line from the bale chamber roller with which the wrapping material is in contact with when being wrapped around the rotor.

9. The agricultural vehicle of claim 8, wherein the knife angle is between 20° and 60°.

10. The agricultural vehicle of claim 1, wherein a tip of the at least one wrap material knife is generally perpendicular to a tangential line of the rotor.

11. The agricultural vehicle of claim 1, wherein the at least one wrap material knife is configured to stay generally fixed in place.

12. The agricultural vehicle of claim 11, wherein the at least one wrap material knife is bolted in place.

13. The agricultural vehicle of claim 1, wherein the at least one wrap material knife is configured to move between a first position and a second position.

14. The agricultural vehicle of claim 13, wherein the at least one wrap material knife is configured to pivot between the first position and the second position.

15. The agricultural vehicle of claim 1, wherein the agricultural vehicle is a round baler.

\* \* \* \* \*